United States Patent [19]

Sawdon et al.

[11] Patent Number: 5,962,375
[45] Date of Patent: Oct. 5, 1999

[54] WELLBORE FLUIDS

[75] Inventors: Christopher Alan Sawdon; Shreekant Babulal Mehta, both of Cornwall, United Kingdom

[73] Assignee: Dowell, a division of Schlumberger Technology Corporation, Sugar Land, Tex.

[21] Appl. No.: 08/646,245

[22] PCT Filed: Sep. 12, 1995

[86] PCT No.: PCT/EP95/03579

§ 371 Date: Jul. 29, 1996

§ 102(e) Date: Jul. 29, 1996

[87] PCT Pub. No.: WO96/08543

PCT Pub. Date: Mar. 21, 1996

[30] Foreign Application Priority Data

Sep. 15, 1994 [GB] United Kingdom .................... 9418553

[51] Int. Cl.⁶ .................... C09K 7/02; C09K 7/06
[52] U.S. Cl. .................... 507/140; 507/269; 507/922; 507/925; 507/928
[58] Field of Search .................... 507/269, 922, 507/925, 928, 140; 166/305.1, 306, 308

[56] References Cited

U.S. PATENT DOCUMENTS 4,422,948 12/1983 Corley et al. .................... 507/104
4,426,296 1/1984 Crowe .................... 507/260

OTHER PUBLICATIONS

Rutherford, Spec. Publ.—R. Soc. Chem., vol. 76, pp. 266–276, (1990).

*Primary Examiner*—Philip Tucker
*Attorney, Agent, or Firm*—John E. Vick, Jr.; Douglas Y'Barbo

[57] ABSTRACT

Wellbore fluids are disclosed which comprise liquid dispersions of particulate mixed divalent metal carbonates having a generally platy crystal form. Mixed alkaline earth metal carbonates are preferred. The invention further relates to a method of well construction, well remediation, or stimulation utilizing such wellbore fluids.

23 Claims, No Drawings

WELLBORE FLUIDS

This application is a 371 application of PCT/EP 95/03579 filed Sep. 12, 1995.

This invention relates to wellbore fluids suitable for use in the oil and gas exploration and production industries and embraces fluids used for drilling, completion, cementing, workover or packing of wellbores, and includes so called "spacer fluids" and "spotting fluids" whose functions are, respectively, to separate dissimilar fluids during pumping operations, and to spot or treat certain intervals of the wellbore. The term "wellbore fluid" also embraces so-called "fracturing fluids" which are pumped at a pressure sufficient to fracture the rock forming the producing reservoir.

During well construction, there are many occasions when it is necessary to pump wellbore fluids which are viscosified in order to, for example, remove debris such as cuttings from a well, or which are gelled sufficiently to suspend quantities of powdered dense minerals such as barytes.

It is also frequently important that the slurries forming the wellbore fluids do not leak-off or filter into permeable formations at a high rate. For instance during drilling, high filtration rate fluids may produce a thick filter cake leading to sticking of the drill string. Equally the invasion of large quantities of filtrate may damage the permeability of reservoir rocks causing reduced hydrocarbon production. If cement slurries filter too readily, premature solidification of the cement may occur during the pumping operation. Fracturing operations are less efficient if the fracturing fluid "leaks-off" into porous rock, losing the pressure required to fracture further.

Whilst many soluble polymers have been developed to provide viscosity and filtration control, it is frequently desirable to combine these with, or use alone, finely divided minerals to enhance or achieve the above properties.

According to a first aspect of the invention, there is provided a wellbore fluid comprising a liquid dispersion of a particulate mixed divalent metal carbonate which has a generally platy crystal form.

Where the wellbore fluid is two phase, for example an emulsion wellbore fluid having oily and a water phases, the particulate carbonate may be dispersed or mixed in either or both of the phases.

Preferred mixed divalent metal carbonates are the mixed alkaline earth metal carbonates, and presently the most preferred of these is huntite.

Huntite is a carbonate of calcium and magnesium of the general formula $CaMg_3(CO_3)_4$. It occurs in nature in the USA and Greece as compact masses of very small crystals of the order of 1 micron and the crystals are generally platy in nature. The chalk-like material as mined is readily milled, and the mineral easily disperses to discrete crystals on shearing in water.

The particulate mixed metal carbonate, such as huntite, should preferably have an aspect ratio of at least 5 and will typically have a particle size distribution such that a high proportion, such as 90% or more, of the particles have an equivalent spherical diameter (esd) in the range of from 0.1–5 microns.

The invention is not restricted to mixed metal carbonates, such as huntite, obtained from natural deposits. Synthetic huntite or other synthetic mixed metal carbonates obtained by precipitation from aqueous solutions may be a potential alternative source.

In the wellbore fluid of the invention, the mineral particles may be dispersed or mixed in any liquid phase, suitable for a wellbore fluids such as, for example, fresh water, sea water, brines of water soluble salts, oily liquids such as petroleum oils and derivatives, esters, ethers, mono alphaolefins, polyalphaolefins, acetals, and emulsions.

It has surprisingly been found that mixed metal carbonates having a generally platy crystal character, such as huntite (natural or synthetic) will confer the advantageous properties of increased viscosity and gelation, and of reduced filtration rate, when mixed into the liquid phase.

Unlike bentonite which will only develop viscosity and filtration control in relatively fresh water, platy mixed metal carbonates such as huntite are effective by direct mixing into brines such as solutions of the halides of the alkali metal of alkaline earth metal groups, formates of the alkali metal group, and potassium carbonate. Particularly advantageous results have been obtained using brines of formates of the alkali metal group, such as potassium formate; these give good results when the mixed metal carbonate is huntite.

Unlike attapulgite and asbestos, whose fibrous nature presents a health hazard by dust inhalation, huntite is of low risk, and its filtration control effect is superior.

Another significant advantage of platy mixed metal carbonates such as huntite over the clay minerals is that they may readily be dissolved in acids, allowing simple removal by acidisation of residual huntite solids which may temporarily plug channels such as perforations in an oil or gas producing formation.

Other additives which may be contained in the wellbore fluid of the invention include, but are not limited to: cement, water soluble polymers such as xanthan gum, hydroxyethylcellulose and other cellulose derivatives, guar gum and derivatives such as hydroxypropyl guar, pregelatinised starch and derivatives such as carboxymethylstarch; synthetic polymers such as polyacrylamides, polyacrylates, and copolymers of sulphonated ethylenically unsaturated monomers with other vinyl monomers. Emulsifiers and wetting agents may be added when required. Density increasing agents such as powdered barytes, hematite or calcium carbonate may be incorporated. The wellbore fluid may contain other additives known to those skilled in the art.

The dose of the mixed metal carbonate, such as huntite, in the wellbore fluid is preferably at least about 3.5 lbs per barrel (10 kg/m$^3$). The preferred upper limit for the amount of huntite in the wellbore fluid is about 140 lbs per barrel (400 kg/m$^3$).

Optionally, for applications in wellbore fluids comprising an oily continuous liquid phase, the mixed metal carbonate, such as huntite, may be treated prior to use with an agent rendering the surface of the huntite particles at least partially hydrophobic. The hydrophobising agent may be an agent having one or more non-polar portions (such as an alkyl chain or chains, each of which has from, for example, 10 to 30 carbon atoms) and a suitable polar portion, and may, for example, be selected from the group including, but not being limited to:

fatty acids such as stearic or palmitic acid and their soaps;

phosphate esters of alcohols or alcohol ethoxylates possessing a sufficiently large alkyl chain to provide the hydrophobising effect, and their salts; and alkyl sulphonates or alkylaryl sulphonates and their salts.

The pretreatment may, for instance, consist of the addition of sufficient of the hydrophobising agent to a slurry of the mixed metal carbonate, followed by filtration, drying and milling. Alternatively, the filtration and subsequent steps may be omitted, the slurry of hydrophobised huntite being added directly to the wellbore fluid. This latter process may be performed at the well site.

According to a second aspect of the invention, there is provided a method of well construction, well remediation or stimulation wherein a wellbore fluid according to the first aspect of this invention is employed.

After the operation is completed, the well may be directly prepared for production. Alternatively an acidic solution such as hydrochloric acid may be introduced to the well whereupon residual mineral solids, such as the filter cake deposited during the method, are dissolved by the acid causing the opening of flow channels in the reservoir interval, and allowing increased production of hydrocarbons, or increased injection of fluids in the case of an injection well.

The invention will now be illustrated by reference to the following examples. In these examples, the wellbore fluid properties were tested in accordance with API (American Petroleum Institute) RP 13B-2 1990.

The following abbreviations are used:

PV The plastic viscosity of a drilling fluid (centipoise). Generally low PV is advantageous.

AV The apparent viscosity of a drilling fluid (centipoise).

YP The yield point (lbs/100 ft$^2$) of the fluid and is a measure of the non Newtonian viscous characteristics.

6 rpm & 3 rpm Dial readings on the Fann Viscometer which indicate the viscosity at low shear rates. Higher 6 rpm, and 3 rpm values indicate greater thixotropy which is generally advantageous.

Gels A measure of the gelling and suspending characteristics of the fluid (lbs/100 ft$^2$), determined using the Fann viscometer.

API FL API room temperature fluid loss. A measure of the ease of filtering a drilling fluid through a filter paper at 100 psi differential pressure. Results in milliliters of filtrate. Low filtrate volumes are advantageous.

EXAMPLE 1

An aqueous potassium formate (75% w/w) brine exhibited a specific gravity of 1.57. Its viscosity and filtration properties were measured.

To 522 grams of the potassium formate solution was added 45 grams of powdered huntite. The suspension was mixed for ten minutes using a Silverson high shear mixer. The resulting viscous slurry exhibited a specific gravity of 1.62. Its viscosity was measured prior to dynamic heat ageing (BHR) of the fluid in a rolling pressurised cell for sixteen hours at 142° C. (288° F.), whereupon (AHR), its viscosity and filtration properties were determined. The results obtained are displayed in Table 1.

The results show the ready development of very advantageous viscous properties by the simple mixing of huntite into a dense potassium formate brine. Good rheological properties are maintained after exposure to a high temperature (142° C.). Surprisingly, the huntite confers a eight-hundred-fold reduction in filtration rate.

TABLE 1

|  | PV | YP | 6 rpm | 3 rpm | Gels | API FL |
|---|---|---|---|---|---|---|
| 75% Potassium Formate Brine | 2 | 0 | 0 | 0 | 0/0 | 200 ml in 5 sec |
| Brine + 45 g Huntite BHR | 18 | 64 | 18 | 18 | 8/10 | — |
| Brine + 45 g Huntite AHR | 40 | 80 | 19 | 16 | 10/12 | 90 ml in 30 min. |

EXAMPLE 2

A sodium chloride brine of specific gravity 1.14 was viscosified with IDHEC (mark of Schlumberger) hydroxy-ethylcellulose according to the following formulation which produces 350 ml of fluid:

| Water | 324.5 g |
|---|---|
| Sodium Chloride | 73.8 g |
| IDHEC | 1.0 g |

A similar formulation was mixed to include powdered huntite according to the following formulation (also to 350

| Water | 307.8 g |
|---|---|
| Sodium Chloride | 70.0 g |
| IDHEC | 1.0 g |
| Huntite | 45.0 g |

The rheological and filtration properties of both fluids were measured and are displayed in Table 2. The results show that huntite imparts a very advantageous increase in yield point and, in particular, in the low shear rate viscosity and gels of the fluid. This particularly improves the suspending ability of the fluid and its ability to carry cuttings, suspended larger particles, or debris in a wellbore pumping operation.

The huntite has conferred a very advantageous reduction in filtration rate by a factor of one thousand two hundred.

TABLE 2

|  | PV | YP | 6 rpm | 3 rpm | Gels | API FL |
|---|---|---|---|---|---|---|
| Brine + IDHEC | 11 | 10 | 1 | 1 | 1/1 | 180 ml in 15 sec. |
| Brine + IDHEC + Huntite | 30 | 85 | 35 | 30 | 23/25 | 18 ml in 30 min. |

EXAMPLE 3

The filter cake from the filtration test in Example 2 was placed in a beaker and covered with 15 percent hydrochloric acid. Rapid and complete dissolution of the cake occurred. This illustrates the advantage that residual wellbore fluid of the present invention, and its filter cakes may readily be removed from a wellbore by conventional acid pumping operations.

EXAMPLE 4

A guar gum base solution such as may be used in well-fracturing operations was prepared to the following formulation.

| Water | 1 liter |
|---|---|
| Potassium Chloride | 20 g |
| F75N ™ Fluorosurfactant | 1 ml |
| Guar Gum | 3.6 g |

A similar formulation was mixed to include powdered huntite at a dose of 20 g/l.

The rheological and filtration properties of both fluids were measured and are displayed in table 3.

TABLE 3

|  | PV | YP | 6 rpm | 3 rpm | Gels | API FL |
|---|---|---|---|---|---|---|
| Base Solution | 8.5 | 11.5 | 2 | 1 | 1/1 | 200 ml in 2 min. |
| Base Solution + 20 g/l Huntite | 13.0 | 19.0 | 4 | 3 | 3/5 | 17.2 ml in 30 min. |

The results show that the huntite addition has conferred an advantageous increase in the YP and Gels of the fluid, and, more particularly, a reduction in filtration rate by a factor of 174.

EXAMPLE 5

The viscosifying filtration control and acid solubility properties of huntite were compared to those of the conventional wellbore fluid materials bentonite and attapulgite (salt gel), when mixed into a potassium chloride brine based drilling fluid.

The following fluid formulations were mixed, (each formulation providing 350 mls of fluid, value in gramms).

| FORMULATION | A | B | C | D | E | F |
|---|---|---|---|---|---|---|
| Water | 295.5 | 295.0 | 294.7 | 289.1 | 288.0 | 287.5 |
| KCl | 102.2 | 102.3 | 102.2 | 100.2 | 99.9 | 99.7 |
| Huntite | 20.00 | | | 40.00 | | |
| Bentonite | | 20.00 | | | 40.00 | |
| Attapulgite | | | 20.00 | | | 40.00 |
| Hydroxyalkyl Starch | 6.00 | 6.00 | 6.00 | 6.00 | 6.00 | 6.00 |

The Hydroxyalkyl starch is a conventional filtrate loss reducer for brine based fluids.

The rheological properties of each fluid were tested both before (BHR) and after (AHR) heat ageing at 250° F. for 16 hours. The filtration control performance was tested after heat ageing. The results are shown in Table 4.

TABLE 4

|  |  | Additives | 6 rpm | 3 rpm | Gels10s | Gels 10 min | PV | YP | API FL |
|---|---|---|---|---|---|---|---|---|---|
| A | BHR | 20 g | 9 | 8 | 9 | | 7 | 14 | |
|   | AHR | Huntite | 6 | 5 | 9 | 7 | 5 | 8 | 7.0 |
| B | BHR | 20 g | 3 | 3 | 3 | | 5 | 3 | |
|   | AHR | Bentonite | 2 | 2 | 2 | 2 | 2 | 3 | 8.5 |
| C | BHR | 20 g | 18 | 11 | 12 | | 12 | 65 | |
|   | AHR | Attapulgite | 18 | 16 | 22 | 26 | 14 | 26 | 39.0 |
| D | BHR | 40 g | 26 | 25 | 24 | | 12 | 37 | |
|   | AHR | Huntite | 23 | 21 | 18 | 18 | 12 | 36 | 10.5 |
| E | BHR | 40 g | 4 | 3 | 3 | | 4 | 6 | |
|   | AHR | Bentonite | 3 | 3 | 2 | 2 | 3 | 4 | 59.0 |
| F | BHR | 40 g | 71 | 42 | 46 | | | | |
|   | AHR | Attapulgite | 60 | 42 | 61 | 78 | | | 58.0 |

The rheology results clearly show that Huntite is an effective viscosifier for potassium chloride brine based fluids. This is in contrast to bentonite which is known not to develop viscosity in salt solutions (especially potassium chloride). Although attapulgite clay is a more effective viscosifier, huntite provides approximately a five fold reduction in filtration rate compared to attapulgite.

The filter cakes from fluids A, B and C were placed in 160 ml of 15% HCl for one hour. The acid insoluble residues were then measured by filtration, drying, and weighting.

| Results | Weight of Residue (g) |
|---|---|
| A (Huntite) | 0.001 |
| B (Bentonite) | 0.521 |
| C (Attapulgite) | 1.350 |

Clearly the huntite filter cake is soluble in 15% HCl in comparison to bentonite and attapulgite which leave substantial residues of insoluble clay. In a well, these residues would almost certainly reduce the permeability of a formation and the well's productivity.

EXAMPLE 6

Synthetic Huntite Manufacturing Procedure

Method 1

A mixed magnesium chloride/calcium chloride brine was formulated using 28 g $CaCl_2 \cdot 2H_2O$ and 115 g $MgCl_2 \cdot 6H_2O$ (all analytical reagents from BDH) made up to 2 liter of brine using distilled water. A second solution was made containing 90 g of $Na_2CO_3$ (analytical reagent ex BDH) in 1 liter of solution using distilled water.

200 ml of the magnesium/calcium chloride brine were placed into a Hamilton Beach mixer cup and stirred on the mixer at low speed. 95 ml of the $Na_2CO_3$ solution were slowly poured into the central vortex and immediately a white precipitate was formed. The mixture was allowed to mix for a further 2 minutes to ensure complete mixing.

The resulting suspension was filtered and washed with distilled water. The white precipitate was dried and analysed by x-ray diffraction. The results showed diffraction peaks corresponding to spacings of 2.833 Å, 2.888 Å, 1.972 Å the characteristic spacings for huntite.

Method 2

A slightly different manufacturing process was tried using a more concentrated brine solution 107.4 g $CaCl_2 \cdot 2H_2O$ and 445.0 g $MgCl_2 \cdot 6H_2O$ made up to 1 liter with distilled water. The second solution was made containing 403.3 g of $K_2CO_3$ in 1 liter of solution (with distilled water). The second fluid was filtered to $<\mu m$ to remove any particulate contaminants.

175 ml of the calcium/magnesium chloride brine was placed in a Hamilton Beach mixer cup and stirred at low speed. 175 ml of the $K_2CO_3$ solution was slowly added to the vortex. The white precipitate produced a very viscous suspension which had to be transferred to a paddle mixer to complete mixing. As made the suspension had a PV of 11 cp, YP of 32 lb/100 $ft^2$ and 6 and 3 readings of 22 and 16 respectively. The suspension was filtered and washed with distilled water. The white precipitate was dried and analysed by x-ray diffraction. The results showed diffraction peaks corresponding to spacings of 2.833 Å, 2.888 Å and 1.972 Å, the characteristic spacings for huntite.

We claim:

1. A fluid selected from the group consisting of a fracturing fluid, a drilling fluid, a spotting fluid, a wellbore cement and a spacer fluid, said fluid comprising a brine and a liquid dispersion of a particulate mixed divalent metal carbonate having a platy crystal form.

2. The fluid of claim 1 in which the particulate mixed divalent metal carbonate is a mixed alkaline earth metal carbonate.

3. The fluid of claim 1 in which the particulate mixed divalent metal carbonate is selected from natural or synthetic huntite.

4. The fluid of claim 2 in which the particulate mixed divalent metal carbonate is selected from natural or synthetic huntite.

5. A wellbore fluid comprising an oily continuous liquid phase comprising a particulate mixed divalent metal carbonate having a platy crystal form, the particulate mixed divalent metal carbonate having been treated prior to use with an agent rendering the surface of said divalent metal carbonate at least partially hydrophobic.

6. The wellbore fluid of claim 5 in which the particulate mixed divalent metal carbonate is a mixed alkaline earth metal carbonate.

7. The wellbore fluid of claim 5 in which the particulate mixed divalent metal carbonate is selected from natural or synthetic huntite.

8. In a method of well construction in which a wellbore fluid is employed, the improvement comprising using a wellbore fluid comprising a liquid dispersion of a particulate mixed divalent metal carbonate having a platy crystal form.

9. The method of claim 8 wherein the wellbore fluid comprises a mixed alkaline earth metal carbonate.

10. The method of claim 8 in which the particulate mixed divalent metal carbonate is selected from natural or synthetic huntite.

11. In a method of well remediation in which a wellbore fluid is employed, the improvement comprising using a wellbore fluid comprising a liquid dispersion of a particulate mixed divalent metal carbonate having a platy crystal form.

12. The method of claim 11 wherein the wellbore fluid comprises a mixed alkaline earth metal carbonate.

13. The method of claim 11 in which the particulate mixed divalent metal carbonate is selected from natural or synthetic huntite.

14. In a method of well stimulation in which a wellbore fluid is employed, the improvement comprising using a wellbore fluid comprising a liquid dispersion of a particulate mixed divalent metal carbonate having a platy crystal form.

15. The method of claim 14 wherein the wellbore fluid comprises a mixed alkaline earth metal carbonate.

16. The method of claim 15 in which the particulate mixed divalent metal carbonate is selected from natural or synthetic huntite.

17. The method of claim 8 wherein an acidic solution is introduced to the well to dissolve residual mineral solids deposited by the method.

18. The method of claim 11 wherein an acidic solution is introduced to the well to dissolve residual mineral solids deposited by the method.

19. The method of claim 14 wherein an acidic solution is introduced to the well to dissolve residual mineral solids deposited by the method.

20. An oil-based drilling fluid consisting essentially of $CaMg_3(CO_3)_4$, and an emulsifier.

21. A fracturing fluid consisting essentially of $CaMg_3(CO_3)_4$, and a compound selected from the group consisting of water-soluble polymers.

22. The fluid according to claims 20 or 21 wherein said $CaMg_3(CO_3)_4$ is present in said fluid at a concentration of between about 10 kg/m$^3$ and about 50 kg/m$^3$.

23. The fluid according to claims 20 or 21 wherein said $CaMg_3(CO_3)_4$ is present in said fluid at a concentration of between about 60 kg/m$^3$ and about 200 kg/m$^3$.

* * * * *